United States Patent [19]
Revoldt

[11] Patent Number: 5,411,305
[45] Date of Patent: May 2, 1995

[54] DOUBLE HANDLE SNOW SHOVEL

[76] Inventor: Paul L. Revoldt, 49535 South Dr., Plymouth, Mich. 48170

[21] Appl. No.: 209,263

[22] Filed: Mar. 14, 1994

[51] Int. Cl.⁶ .......................... A01B 1/22; B25G 3/38
[52] U.S. Cl. ...................................... 294/58; 294/54.5
[58] Field of Search ........................ 294/54.5, 57–59; 15/145; 16/114 R; 37/265, 285; 172/371, 372

[56] References Cited

U.S. PATENT DOCUMENTS

| | | | |
|---|---|---|---|
| 911,291 | 2/1909 | Byor | 294/58 |
| 933,647 | 9/1909 | Hunt | 294/58 |
| 982,145 | 1/1911 | Langlois | 294/58 |
| 1,151,012 | 8/1915 | Herringstad | 294/58 |
| 4,229,033 | 10/1980 | Vosbikian | 294/58 |
| 4,537,433 | 8/1985 | Yang | 294/58 |
| 4,944,541 | 7/1990 | Waldschmidt | 294/58 |

FOREIGN PATENT DOCUMENTS

| | | | |
|---|---|---|---|
| 973976 | 2/1951 | France | 294/58 |
| 1109731 | 2/1956 | France | 294/58 |
| 2481870 | 11/1981 | France | 294/58 |
| 124261 | 3/1919 | United Kingdom | 294/58 |
| 2156641 | 10/1985 | United Kingdom | 294/58 |

Primary Examiner—Johnny D. Cherry
Attorney, Agent, or Firm—Charles W. Chandler

[57] ABSTRACT

A snow shovel has a long handle, a gripping member at the upper end of the long handle for one hand of the user, a snow shovel blade at the lower end, and a shorter handle having its lower end pivotally mounted on the long handle adjacent the blade. The upper end of the short handle has a gripping member for the user's other hand. A clamp is fastened to the long handle, and has a pair of pivot elements for engaging the lower end of the short handle. A fastener on the clamp releases the clamp so that it can be slid along the long handle to a different position, or removed when the snow shovel has become worn.

2 Claims, 2 Drawing Sheets 5,411,305

DOUBLE HANDLE SNOW SHOVEL

BACKGROUND OF THE INVENTION

Lifting implements such as snow shovels and the like conventionally have a long handle with a gripping member at the upper end of the handle and a snow blade at the lower end. Some snow shovels have a second shorter handle pivotally mounted on the longer handle just above the snow shovel blade.

One commercial form of this type of snow shovel has a pivot member passing through an opening in the long handle which ultimately may weaken the long handle. Further, this type of shovel does not readily accommodate either changing the shorter handle to accommodate either a shorter or taller user, or removing the short handle for use on another shovel having an unworn blade.

The purpose of a double handled shovel is to reduce the bending effort required to lift the load. The user grasps a conventional shovel by placing one hand adjacent the blade so that he has to bend down a substantial distance to lift the load on the blade. The secondary handle permits him to lift the load with his left hand, assuming he is right-handed, without the full bending motion required by a single handle shovel.

Another form of this type of shovel is illustrated in U.S. Pat. No. 4,944,541 which was issued Jul. 31, 1990. This type of implement also has a second shorter handle. The longer handle has a series of apertures for fastening a brace that pivotally connects the lower end of the short handle to the long handle. Ultimately, such apertures in the long handle tend to weaken the handle. Further, this device does not provide the leverage that is best for lifting a load of snow because the short handle is connected about half way between the blade and the grip at the upper end of the long handle. The better position is to connect the short handle closely adjacent the blade in order to optimize the leverage of the handle gripping the upper end of the long handle.

SUMMARY OF THE INVENTION

The broad purpose of the present invention is to provide a dual handle lifting implement, such as a snow shovel, in which a short handle is pivotally mounted on a longer handle. The preferred embodiment of the invention employs a clamping device for engaging the long handle without forming a mounting hole in the long handle. The lower end of the short handle is pivotally mounted on the clamping device.

Such an arrangement provides several advantages over the prior art of which I am aware. For example, a user can easily adjust the position of the short handle by loosening a fastener on the clamp, and sliding the clamp along the long handle to a suitable position. Further, the short handle can be easily removed from the long handle when the snow shovel blade has been worn out as is the tendency of the less expensive implements. The short handle can be offered in two or more lengths depending upon whether the user is tall or short.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
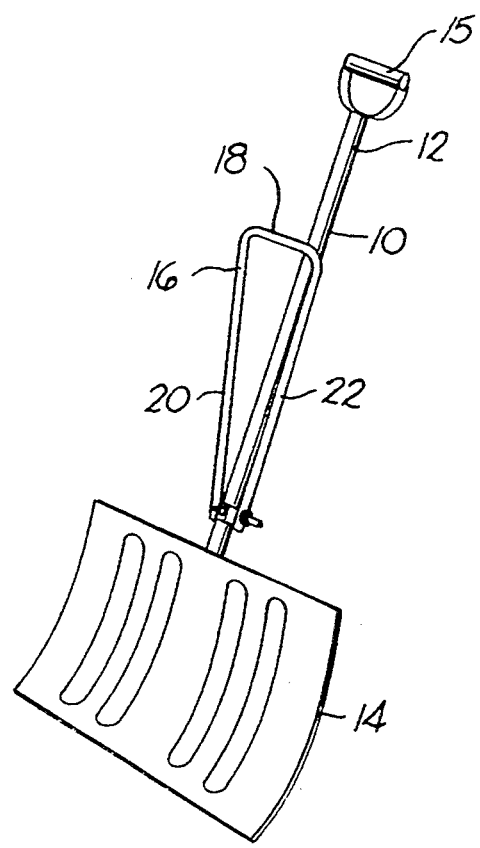
FIG. 1 illustrates a snow shovel embodying the invention.

Referring to the drawings, a preferred lifting implement takes the form of a shovel 10. Shovel 10 has a conventional long wooden handle 12. Wooden handle 12 could be formed of metal or another suitable material. A conventional shovel blade 14 is attached to the lower end of handle 12. A gripping member 15 is attached to the upper end of handle 12.

An elongated shorter handle 16 has a gripping section 18 and a pair of generally parallel legs 20 and 22. Handle 16 may be formed of a section of metal tubing, bent as illustrated in FIG. 1. The lower ends of legs 20 and 22 are flattened as illustrated at 24 and 26, respectively. The flattened ends are spaced a distance slightly greater than the diameter of handle 12. Handle 12 has a generally cylindrical exterior surface with a uniform diameter along its length.

The flattened lower end of leg 20 has an opening 28, and the flattened lower end of leg 22 has an opening 30. The two openings are aligned with respect to one another.

Figure 3:
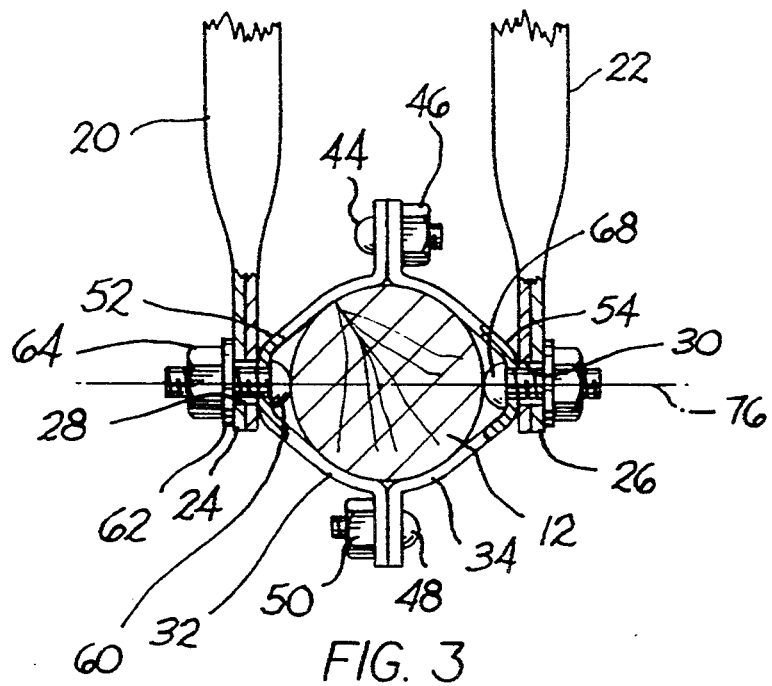
FIG. 3 is a sectional view through the long handle closely adjacent the clamping member.
Figure 4:
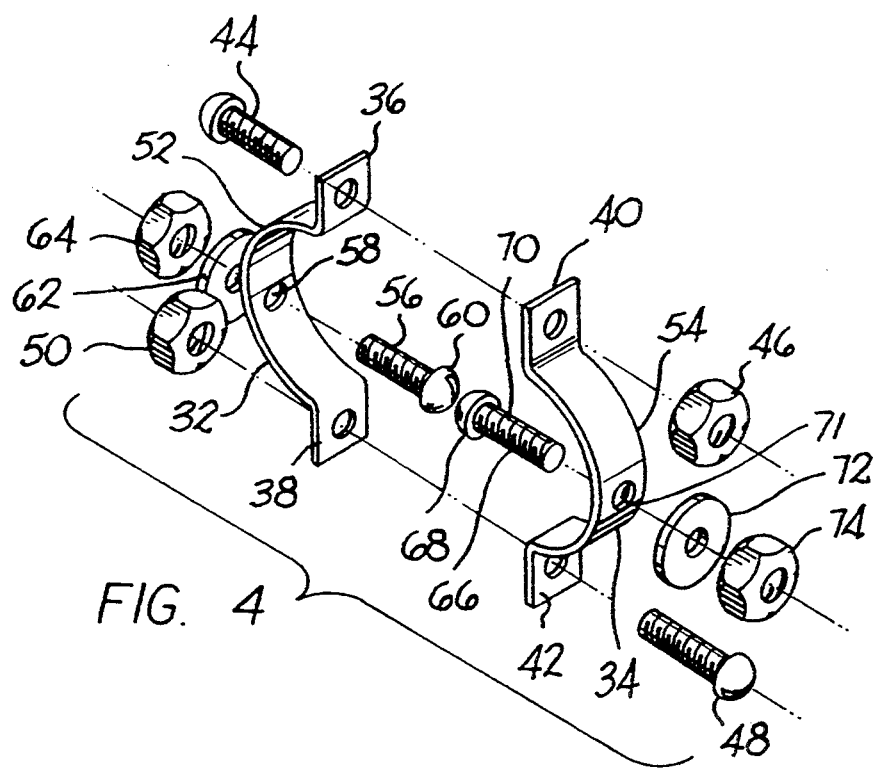
FIG. 4 is an exploded view of the clamping device.

A pair of metal clamping members 32 and 34, as best illustrated in FIGS. 3 and 4, are mounted on opposite sides of handle 12. Clamping member 32 is disposed adjacent the flattened end 24 of leg 20. Clamping member 34 is disposed adjacent the flattened end 26 of leg 22. Clamping member 32 has its ends forming a pair of flat apertured tabs 36 and 38 while clamping member 34 has its ends forming a pair of apertured flat tabs 40 and 42. The two clamping members are formed so that tab 36 is disposed adjacent tab 40, and tab 38 is disposed adjacent end 42. The two clamping members are formed so that there is a slight space between the tabs so that as the clamping members are brought toward handle 12, they form a tight frictional engagement around the handle.

Nut and bolt fastening members 44 and 46 connect tab 36 to tab 40. Nut and bolt fastening members 48 and 50 connect tabs 38 and 42. When the fastening members are loosened, the two clamping members can be slid up along handle 12 to any selected position.

The midsection 52 of clamping member 32 has a somewhat pointed configuration to form a space between the inside surface of the clamping member and handle 12. Similarly, midsection 54 of the clamping member 34 also has a somewhat pointed structure to form a space between the inside surface of the clamping member and handle 12, as illustrated in FIG. 3. A threaded fastener 56 is passed through opening 58 of clamping member 32 with fastener head 60 being disposed inside clamping member 32 as illustrated in FIG. 3. The outer threaded end of fastener 56 is inserted through opening 28 in leg 20. A washer 62 and a lock nut 64 are mounted on fastener 56 to pivotally mount the lower end of leg 20 on fastener 56 which forms a pivot member around which leg 20 can be swung.

Similarly, a threaded fastener 66 has a head 68 disposed between the inside surface of clamping member 34 and handle 12. The threaded portion 70 of fastener 66 is inserted through opening 71 of clamping member 34 and opening 30 in the flattened lower end of leg 32 to form a pivot member around which leg 22 may be swung with leg 20. Washer 72 and lock nut 74 retain the flattened end of leg 22 on threaded section 70 of the fastener. The two fastener pivot members 56 and 70 are disposed along a common axis 76 so that short handle 16 can be freely pivoted around the axis.

It is to be understood that although two clamping members are illustrated for embracing handle 12, a single clamping member could also be employed that essentially encircles handle 12, with a single nut and bolt fastening means connecting the ends of the clamping member. The nut and bolt fastener means could also serve as the pivot means for the lower end of the short handle.

Figure 2:
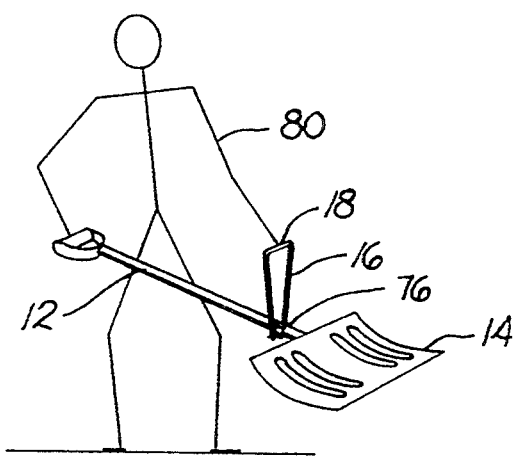
FIG. 2 is a view illustrating the manner in which the user grasps the long handle and the short handle.

FIG. 2 illustrates a stick man 80 handling the lifting implement in the manner used for shoveling snow. Note that one hand holds the upper end of handle 12 and the other hand holds the griping section 18 of the shorter handle. The upper hand holding the longer handle can pivot the lifting blade about the pivot axis of the short handle.

The user can relocate the short handle to a desired clamping position along the long handle to accommodate his own anatomical structure. Further should the blade become worn, he can remove the short handle and mount it on another lifting implement. It is contemplated that the short handle may be offered in different sizes to accommodate the arm lengths of either a short person or a taller person.

Having described my invention, I claim:

1. A long-handled implement for manually lifting a load, comprising:
   an elongated first handle having a longitudinal axis, an upper end, a lower end, and a generally uniform cross section along a portion of its length;
   lifting structure carried on the lower end of the first handle;
   an elongated generally U-shaped member having a pair of short legs having upper ends, and a second handle formed between said upper ends, said legs having lower apertured ends disposed on opposite sides of the first handle in a selected position thereon along the portion thereof having said uniform cross section;
   removable pivot means for connecting the lower ends of the short legs of the second handle to the first handle in said selected position for pivotal motion either toward or away from a position in which the second handle is adjacent the first handle, the pivot means being disposed between the lifting structure and the upper end of the first handle, the pivot means including a pair of generally C-shaped clamping elements each having a pair of ends each of said ends forming a flattened apertured tab, the C-shaped clamping elements having concave sides embracing the first handle on opposite sides of the first handle in an opposed relationship such that the apertured tabs on one of said C-shaped clamping elements are disposed in face-to-face relationship with the tabs on the other of the C-shaped clamping elements, and fastener means for engaging the face-to-face tabs such that the C-shaped clamping elements clampingly engage the first handle, the mid-section of each of the C-shaped clamping elements having a pivot opening, an elongated pivot member disposed in each of said pivot openings along a common pivot axis passing through and generally transverse to the longitudinal axis of the first handle, each of the pivot members having an inner end and an outer end, means connecting the inner end of each of the pivot members to the respective C-shaped clamping element, and
   the apertured lower ends of said legs receiving the pivot members such that the second handle is pivotal about said pivot members, and fastener means mounted on the outer ends of the pivot members to retain the lower ends of the short legs on the pivot members.

2. In combination with a lifting implement for manually lifting a load having an elongated first handle, said first handle having an upper end, a lower end, and a generally uniform cross section along its length; and lifting structure carried on the lower end of the first handle; the improvement comprising:
   an elongated generally U-shaped member having a pair of short legs having upper ends, and a second handle formed between said upper ends, said legs having lower apertured ends disposed on opposite sides of the first handle in a selected position therealong;
   removable pivot means for connecting the lower ends of the short legs of the second handle to the first handle in said selected position for pivotal motion either toward or away from a position in which the second handle is adjacent the first handle, the pivot means being disposed between the lifting structure and the upper end of the first handle, the pivot means including a pair of generally C-shaped clamping elements each having a pair of ends, each of said ends forming a flattened apertured tab, the C-shaped clamping elements having concave sides embracing the first handle on opposite sides of the first handle in an opposed relationship such that the apertured tabs on one of said C-shaped clamping elements are disposed in face-to-face relationship with the tabs on the other of the C-shaped clamping elements, and fastener means for engaging the face-to-face tabs such that the C-shaped clamping elements clampingly engage the first handle, the mid-section of each of the C-shaped clamping elements having a pivot opening, an elongated pivot member disposed in each of said pivot openings along a common pivot axis passing through and generally transverse to the longitudinal axis of the first handle, each of the pivot members having an inner end and an outer end, means connecting the inner end of each of the pivot members to the respective C-shaped clamping element, and
   the apertured lower ends of said legs receiving the pivot members such that the second handle is pivotal about said pivot members, and fastener means mounted on the outer ends of the pivot members to retain the lower ends of the short legs on the pivot members.

* * * * *